United States Patent
Tseng et al.

(10) Patent No.: US 8,745,552 B2
(45) Date of Patent: Jun. 3, 2014

(54) EDA TOOL AND METHOD, AND INTEGRATED CIRCUIT FORMED BY THE METHOD

(75) Inventors: Hsien-Yu Tseng, Tongxiao Township (TW); Shih-Kai Lin, Taipei (TW); Chin-Shen Lin, Taipei (TW); Yu-Sian Jiang, Kaohsiung (TW); Heng-Kai Liu, Pingzhen (TW); Mu-Jen Huang, Taipei (TW); Chien-Wen Chen, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/484,488

(22) Filed: May 31, 2012

(65) Prior Publication Data

US 2013/0320555 A1    Dec. 5, 2013

(51) Int. Cl.
*G06F 17/50* (2006.01)

(52) U.S. Cl.
USPC ............... 716/54; 716/50; 716/55; 716/56

(58) Field of Classification Search
USPC ................................. 716/50, 54–56
See application file for complete search history.

(56) References Cited

U.S. PATENT DOCUMENTS

| 8,347,240 | B2 * | 1/2013 | Agarwal et al. ............ 716/54 |
| 8,359,556 | B1 * | 1/2013 | Abou Ghaida et al. ...... 716/54 |
| 8,418,111 | B2 * | 4/2013 | Chen et al. ............ 716/126 |
| 8,495,548 | B2 * | 7/2013 | Agarwal et al. ............ 716/122 |
| 2008/0307381 | A1 * | 12/2008 | Tritchkov et al. .......... 716/11 |
| 2011/0078638 | A1 * | 3/2011 | Kahng et al. ............ 716/52 |
| 2011/0119648 | A1 * | 5/2011 | Chen et al. ............ 716/126 |
| 2012/0054696 | A1 * | 3/2012 | Su et al. ............ 716/55 |
| 2012/0122023 | A1 * | 5/2012 | Hsu et al. ............ 430/5 |
| 2012/0131528 | A1 * | 5/2012 | Chen et al. ............ 716/112 |
| 2012/0210279 | A1 * | 8/2012 | Hsu et al. ............ 716/53 |
| 2012/0256298 | A1 * | 10/2012 | Fu et al. ............ 257/618 |
| 2013/0061185 | A1 * | 3/2013 | Abou Ghaida et al. ....... 716/55 |
| 2013/0074024 | A1 * | 3/2013 | Chase et al. ............ 716/112 |
| 2013/0086543 | A1 * | 4/2013 | Agarwal et al. ........... 716/119 |
| 2013/0159945 | A1 * | 6/2013 | Kahng et al. ............ 716/52 |
| 2013/0174106 | A1 * | 7/2013 | Hsu et al. ............ 716/55 |
| 2013/0198696 | A1 * | 8/2013 | Wang et al. ............ 716/51 |

OTHER PUBLICATIONS

Ghaida, R. et al., "Single-Mask Double-Patterning Lithography for Reduced Cost and Improved Overlay Control", IEEE Transactions on Semiconductor Manufacturing, Feb. 2011, 24(1):93-103.

(Continued)

*Primary Examiner* — Stacy Whitmore
(74) *Attorney, Agent, or Firm* — Duane Morris LLP; Steven E. Koffs

(57) ABSTRACT

A method comprises: accessing data representing a layout of a layer of an integrated circuit (IC) comprising a plurality of polygons defining circuit patterns to be divided among a number (N) of photomasks for multi-patterning a single layer of a semiconductor substrate, where N is greater than one. For each set of N parallel polygons in the layout closer to each other than a minimum separation for patterning with a single photomask, at least N−1 stitches are inserted in each polygon within that set to divide each polygon into at least N parts, such that adjacent parts of different polygons are assigned to different photomasks from each other. Data representing assignment of each of the parts in each set to respective photomasks are stored in a non-transitory, computer readable storage medium that is accessible for use in a process to fabricate the N photomasks.

22 Claims, 9 Drawing Sheets

(56) References Cited

OTHER PUBLICATIONS

Hsu, C.H. et al., "Simultaneous Layout Migration and Decomposition for Double Patterning Technology", IEEE Transactions on Computer-Aided Design of Integrated Circuits and Systems, Feb. 2011, 30(2):284-294.

Yuan, K. et al., "Double Patterning Layout Decomposition for Simultaneous Conflict and Stitch Minimization", IEEE Transactions on Computer-Aided Design of Integrated Circuits and Systems, Feb. 2010, 29(2):185-196.

* cited by examiner

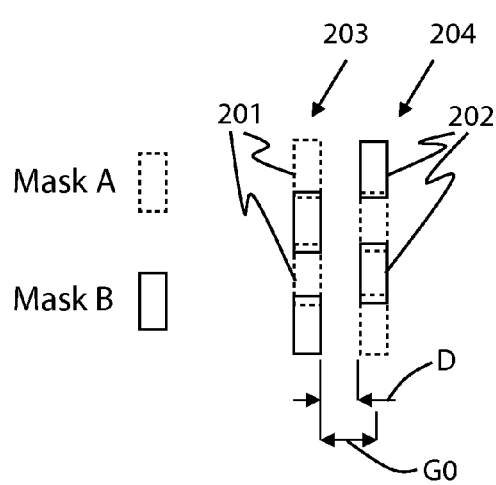
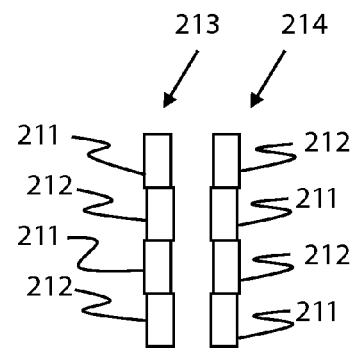
FIG. 2A  FIG. 2B
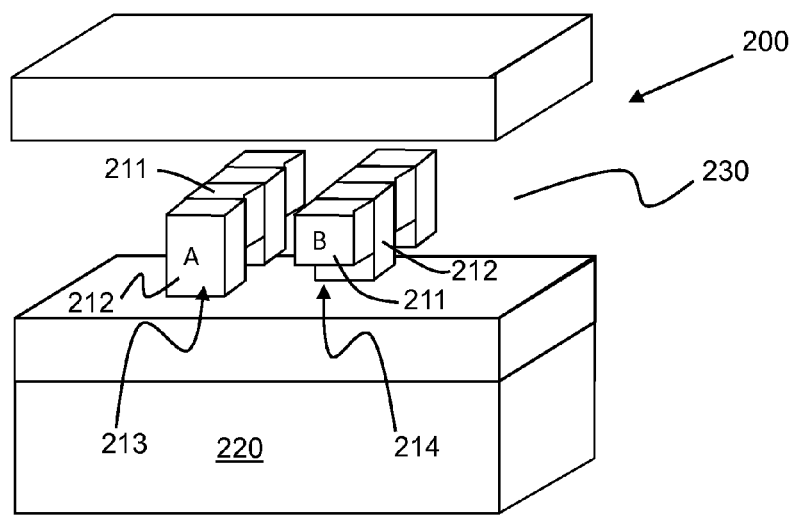
FIG. 2C

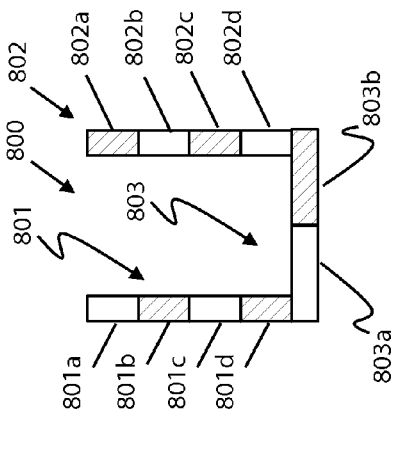
FIG. 8C
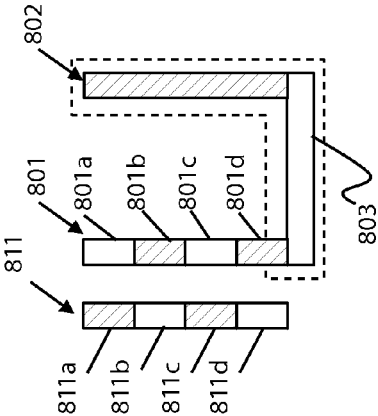
FIG. 8B
FIG. 8A
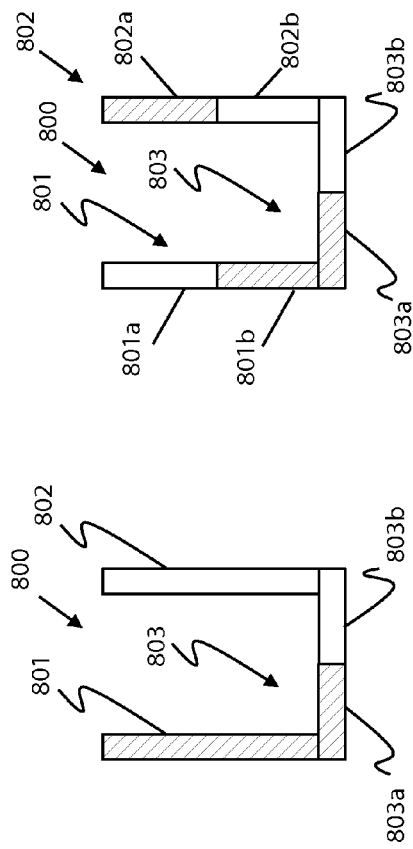
FIG. 8F
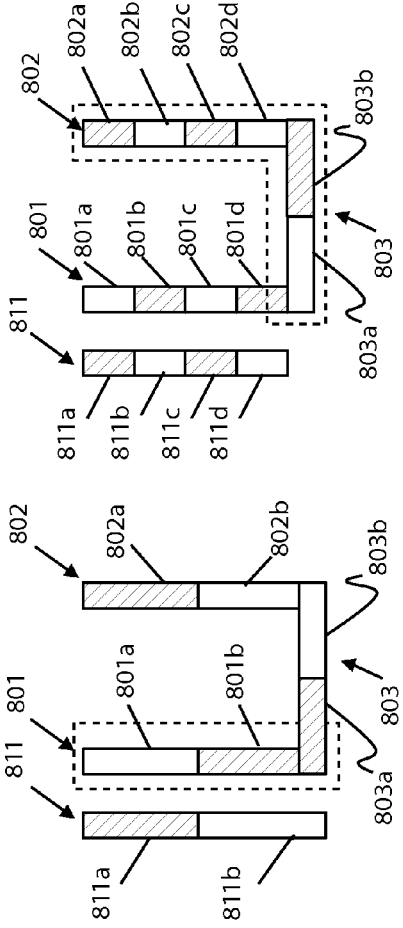
FIG. 8E
FIG. 8D

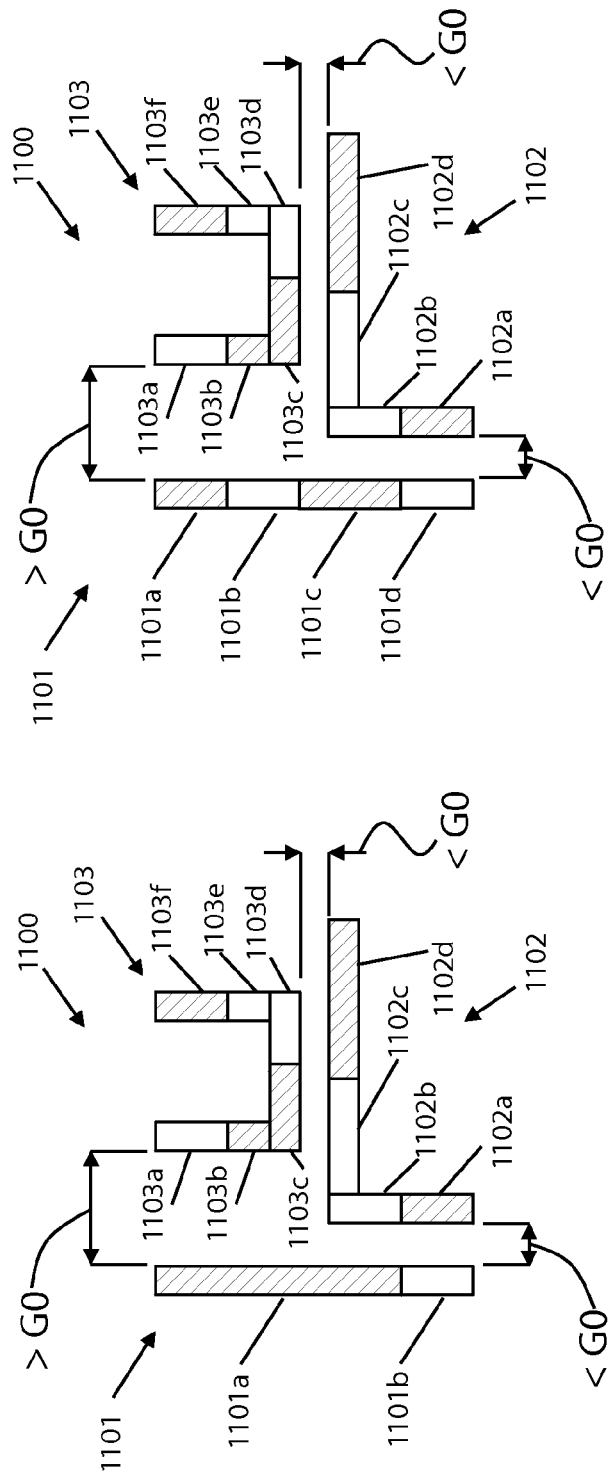

EDA TOOL AND METHOD, AND INTEGRATED CIRCUIT FORMED BY THE METHOD

FIELD

This disclosure relates generally to semiconductor fabrication, and more specifically to multi-patterning of semiconductor substrates.

BACKGROUND

In semiconductor fabrication processes, the resolution of a photoresist pattern begins to blur at about 45 nanometer (nm) half pitch. To continue to use fabrication equipment purchased for larger technology nodes, multi-exposure methods have been developed.

Multiple exposure or multi-patterning technology (MPT) involves forming patterns on a single layer of a substrate using two or more different masks in succession. If only two masks are used for patterning a layer, the technique is referred to as double exposure. One form of double exposure is referred to as double patterning technology (DPT). In DPT, first and second masks are used sequentially to pattern the same layer. As long as the patterns within each mask comply with the relevant minimum separation distances for the technology node, the combination of patterns formed using both masks may include smaller separations than the minimum separation distance. MPT allows line segments, and in some cases, vertices (angles) to be formed of a vertical segment and a horizontal segment on the same mask. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning, DPT), it is customary to refer to the patterns as being assigned one of two "color types", where the color corresponds to a photomask assignment.

If a given pattern in a given layer cannot be assigned to a different mask from every adjacent pattern in the same layer that is closer than the minimum separation distance, the layout has an MPT conflict. The designer can resolve the MPT conflict without increasing the number of masks by making a change to the layout.

BRIEF DESCRIPTION OF THE DRAWINGS

FIG. 2A is a plan view of a portion of a layout having two polygons, each divided into segments for DPT.

FIG. 2B is a plan view of the polygons formed by photomasks having the layout of FIG. 2A, in the presence of mask misalignment.

FIG. 2C is an isometric view of the circuit patterns formed by photomasks having the layout of FIG. 2A, without misalignment.

FIGS. 8A-8G show examples of the method of inserting stitches into complex polygons comprising plural line segments.

FIGS. 11A-11B show an example in which additional stitches are inserted in separated patterns to balance the masks.

DETAILED DESCRIPTION

Figure 1A:
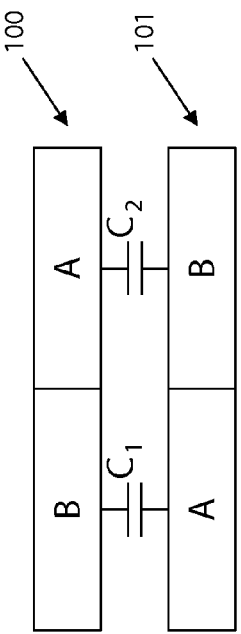
FIG. 1A shows an interconnect structure formed by DPT.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

In the discussion below, reference is frequently made to polygons. One of ordinary skill understands that this is for brevity and ease of understanding. Nevertheless, each reference to a polygon is a reference to a pattern to be formed in a photomask for use in a semiconductor IC fabrication process. Thus, the polygons represent tangible patterns of material formed on a photomask, and tangible IC circuit patterns formed in a semiconductor device using the photomask.

Because of the limitation of lithography, multiple patterning methods are adopted to implement pitch relaxation in advanced technologies. However, the inventors have found that multiple patterning methods also introduce an uncertainty to the parasitics to circuits. For example, some multi-patterning methods employ photomasks and/or sacrificial layers of different thicknesses for patterning the same inter-metal dielectric (IMD) layer by MPT. This can result in formation of trenches having a first depth using a first photomask, trenches having a second depth using a second photomask, etc. When the trenches are filled with conductive material (e.g., copper) to form interconnect lines, the resulting lines formed by different photomasks have different thickness (depth), and different parasitic capacitances from each other.

Several example are discussed below with respect to DPT. However, these examples are only used to simplify explanation of the concepts. The same concepts and techniques can be extended to MPT processes using three, four or more masks to pattern a single layer of an IC.

FIG. 1A shows an example of an interconnect structure having a bottom conductive line layer 150 and a top conductive line layer 151. The conductive line layers 150 and 151 are formed in respective layers of an IMD material 152, for example using a single or dual damascene process. Although one of ordinary skill understands that an IC typically has many intermediate conductive line layers between the bottom and top conductive line layers, only one is shown for ease of understanding. In this example, the intermediate conductive line layer has a plurality of patterns A formed using a first photomask, and a plurality of patterns B formed using a second photomask. As described above, the A patterns extend deeper into the IMD than the B patterns.

Because the IC designer is typically not aware of the different thickness (depth) of each respective pattern, and the information is not reflected in the RC extraction process, or the post-layout simulations performed by the designer. Thus, even if the verification process indicates that the layout meets all timing specifications, changes to the parasitic capacitances introduced by MPT could cause the actual timing to differ from the simulation.

Further, the side effect of multiple patterning is layout pattern dependent. This uncertainty enlarges the gap between simulation and silicon data in high-precision and/or high-speed circuits. For example, in a symmetric circuit, this effect will significantly influence the matching network.

Because the height of polygons on different masks are different, the parasitic resistance are hard to accurately estimate, too. The asymmetric parasitic resistance may cause a serious imbalance in a matching pair.

The inventors have further determined that a mask alignment error may cause a relative shift between the two or more masks used to pattern the same layer. After fabrication, the distances between polygons are different from the distances in original design so that the parasitics between polygons may be overestimated or underestimated.

It is difficult to accurately estimate the polygons' parasitic capacitance after fabrication by corner simulations because distances between polygons formed using two different masks are dependent on the mask alignment. If two parallel lines are formed in two respective masks, the parasitic capacitance of the actual lines will be greater than the simulation prediction, if the misalignment causes the lines to be closer than design, and the parasitic capacitance of the actual lines will be smaller than the simulation prediction if the misalignment causes the lines to be farther apart than design.

Figure 1B:
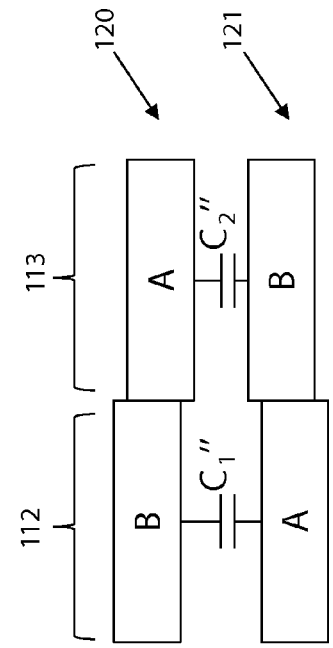
FIG. 1B shows a portion of a layout of an IC according to one embodiment.
Figure 1C:
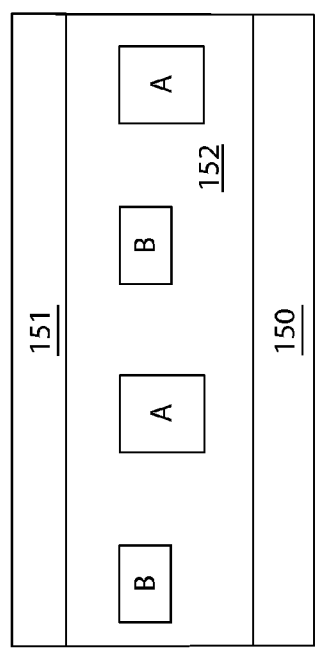
FIGS. 1C and 1D show the portion of the IC of FIG. 1B in the presence of mask misalignments.
Figure 1D:
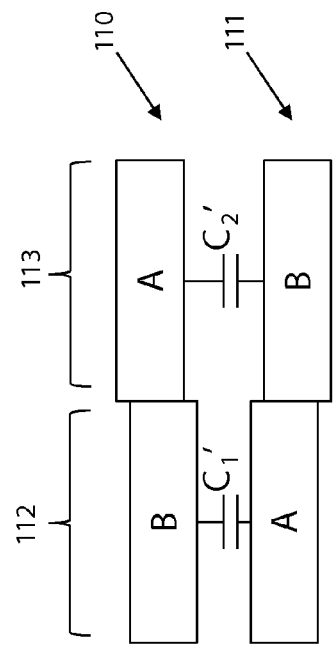

FIGS. 1B-1D show a simple example of a method for distributing polygons (representing circuit patterns) among two or more masks, so that the parasitic capacitances are more predictable, regardless of mask misalignment. This enables a designer to more accurately simulate IC performance, allowing the designer to design the IC without adding excessive design margins to compensate for uncertain parasitic impedances.

FIG. 1B is a plan view of two polygons 100, 101 formed by DPT according to one embodiment. According to one embodiment, a stitch is inserted into each of the polygons 100, 101. In this simple example, DPT would permit each polygon to be completely formed in a respective single mask without a stitch. Nevertheless, a stitch is inserted into each line to reduce parasitic uncertainty, as explained below. As understood by one skilled in the art, insertion of a stitch divides a single polygon into two segments, each formed using a respective mask. The segments have a small overlap, to ensure that there is a continuous conductive pattern, even if there is a relative misalignment between the second photomask and the patterns formed by the first photomask. Thus, polygon 100 has two segments, B and A, and polygon 101 has two segments A and B. As shown in FIG. 1B, there is perfect mask alignment, and the parasitic capacitances $C_1$ and $C_2$ are equal, and the total parasitic capacitance is substantially equal to the simulation prediction $C_1+C_2$.

FIG. 1C shows the same patterns as they would appear after being patterned by DPT, with a relative misalignment between the second photomask and the patterns formed by the first photomask. In the view shown in FIG. 1C, the patterns formed by the A mask are shifted upwards relative to the patterns formed by the B mask. As a result, the left patterns 112 are closer to each other than the design separation, and the parasitic capacitance $C_1'$ between the left patterns 112 is greater than the simulation prediction. Meanwhile, the right patterns 113 are farther from each other than the design separation, and the parasitic capacitance $C_2'$ between the right patterns 113 is less than the simulation prediction. The total parasitic capacitance $C_1'+C_2'$ is approximately equal to the simulation prediction $C_1+C_2$.

FIG. 1D shows the same patterns as they would appear after being patterned by DPT, with a relative misalignment between the second photomask and the patterns formed by the first photomask. The misalignment in FIG. 1D is the opposite of that shown in FIG. 1C. In the view shown in FIG. 1D, the patterns formed by the B mask are shifted upwards relative to the patterns formed by the A mask. As a result, the left patterns 112 are farther from each other than the design separation, and the parasitic capacitance $C_1''$ between the left patterns 112 is less than the simulation prediction. Meanwhile, the right patterns 113 are closer to each other than the design separation, and the parasitic capacitance $C_2''$ between the right patterns 113 is greater than the simulation prediction. The total parasitic capacitance $C_1''+C_2''$ is approximately equal to the simulation prediction $C_1+C_2$. Thus, although the amount of mask misalignment cannot be predicted, FIGS. 2A-2C further illustrate the concept in a DPT process. In FIG. 2A, the assignment of the segments 201 and 202 of each polygon 203, 204 to the A and B masks is shown. In each polygon 203, 204, plural stitches are inserted. As explained below, if a given number N of masks are used to pattern the same layer, where N is an integer greater than 1, then at least N−1 stitches are inserted. The method permits additional stitches to optionally be inserted.

In FIG. 2B, the resulting IC conductive line patterns 213, 214 are shown, as they would appear if there is a mask misalignment which shifts the segments 211 to the left relative to the segments 212. As in the case of FIGS. 1C and 1D, the average distance between lines 213 and 214 is maintained, even though some segments are closer to the corresponding nearest adjacent segment in the other line, and an equal number of segments are further than the corresponding nearest adjacent segment in the other line.

FIG. 2C shows a three-dimensional view of the lines 213 and 214. Just as the lateral parasitic effects are evened out by the segmenting of each line, any variations in parasitic effects due to the different depth of the A segments 212 and B segments 211 are substantially cancelled out by inserting stitches into each line.

The IC 200 comprises a semiconductor substrate 220 having at least one interconnect line layer 230 including a plurality of circuit patterns 213, 314 formed of conductive material. Each of the plurality of circuit patterns 213, 214 is divided into at least N segments 211, 212, where N is greater than one, the conductive material in the at least N segments having N different depths. The depths of each of the segments are arranged, so that within each set of N circuit patterns 213, 214 that are parallel to each other and separated from each other by a distance smaller than a threshold distance, the corresponding segments 211, 212 of different ones of the N circuit patterns which are adjacent to each other have different depths from each other.

The depths of each of the segments 211, 212 within each of the plurality of circuit patterns 213, 214 are arranged according to a sequence, so that within each set of N circuit patterns that are parallel to each other and separated from each other by a distance D smaller than a threshold distance G0 (the minimum separation distance for patterning a layer using a single photomask), each circuit pattern 213, 214 has the same sequence, and each circuit patterns has a different sequence offset from an adjacent one of the set of circuit patterns.

Further, as shown in plan view in FIG. 11B, for example, in some embodiments, the IC comprises at least one additional circuit pattern or portion 1101a, 1101b of an additional circuit pattern 1101, which is separated from every other circuit pattern by at least the threshold distance. The additional circuit pattern is divided into at least N segments 1101a, 1101b. The conductive material in the at least N segments having N different depths. The depths of each of the segments 1101a, 1101b of the additional circuit pattern or portion of the circuit pattern 1101 are arranged, so that, relative to a nearest pattern 1103 of the plurality of circuit patterns, corresponding segments of the additional circuit pattern 1101a, 1101b and of the nearest circuit pattern 1103a, 1103b have different depths from each other.

In some embodiments in FIGS. 8A-11B, as shown in various examples, every circuit pattern in the interconnect line layer is divided into at least N segments, the conductive material in the at least N segments having N different depths.

Figure 3:
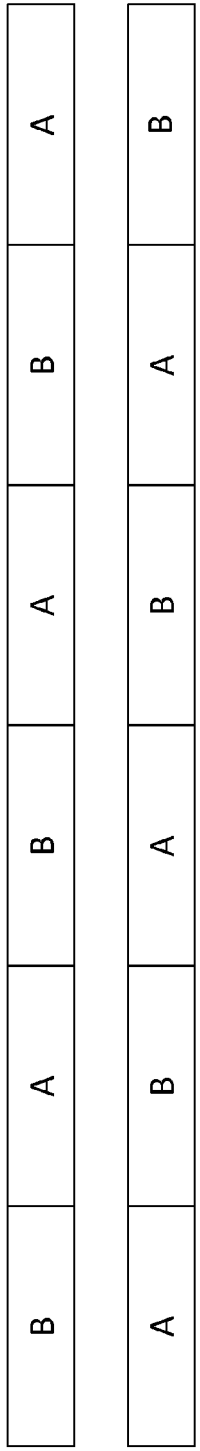
FIG. 3 shows two adjacent circuit patterns, each divided by stitching into two colors for a DPT process using two photomasks to form a single layer.
Figure 4:
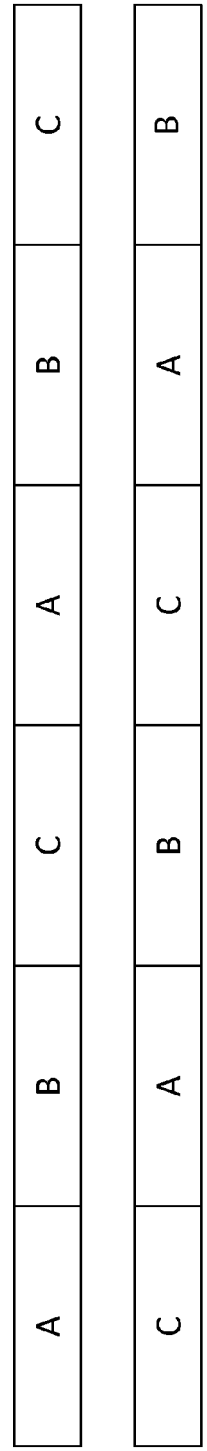
FIG. 4 shows two adjacent circuit patterns, each divided by stitching into three colors for a triple patterning (TPT) process using three photomasks to form a single layer.
Figure 5:
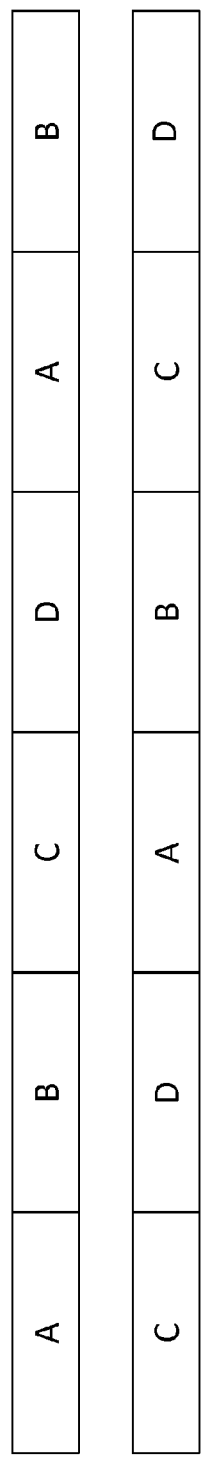
FIG. 5 shows two adjacent circuit patterns, each divided by stitching into four colors for an MPT process using four photomasks to form a single layer.

FIGS. 3-5 show a general application of the method for MPT using different numbers of masks. In FIG. 3, two photomasks are used for a single layer (DPT, N=2). In FIG. 4, three photomasks are used for a single layer (TPT, N=3). In FIG. 5, four photomasks are used (quadruple patterning, N=4). The detailed flow for segmenting each of these sets of polygons is described in detail below. In each case, given N photomasks, each polygon is divided into at least N segments by inserting at least N−1 stitches. Each segment in the first polygon is assigned to a different photomask than its corresponding nearest neighboring segment in the second polygon. Each segment in the second polygon is assigned to a different photomask than its corresponding nearest neighboring segment in the first polygon.

Figure 6:
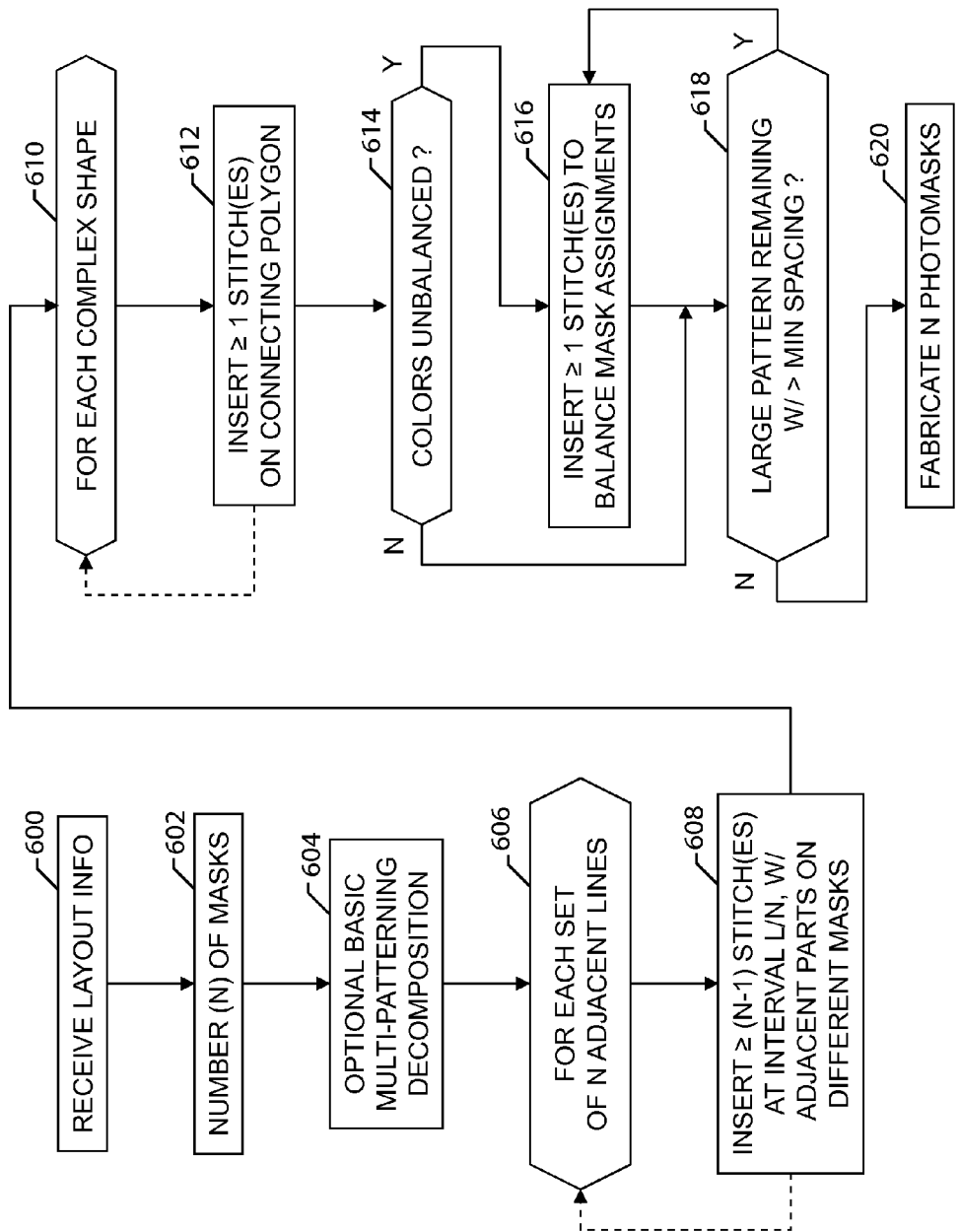
FIG. 6 is a flow chart of a method for determining where to insert stitches.

FIG. 6 is a detailed flow chart showing a method of inserting stitches.

At step 600, the computer implemented EDA tool (or equivalent tool) accesses data representing a layout of a layer of an integrated circuit (IC) comprising a plurality of polygons defining circuit patterns.

At step 602, the number N of photomasks to be used is input by the user or retrieved from the medium containing the layout. The polygons representing circuit patterns in a layer are to be divided among a number (N) of photomasks for multi-patterning a single layer of a semiconductor substrate, where N is greater than one.

At step 604, an optional step of initially assigning each polygon to a respective one of the N photomasks before the step of inserting N−1 stitches is performed. For example, in some embodiments, the spacing between each pair of adjacent polygons is determined. A minimum separation between adjacent patterns to be formed by a single photomask is determined from the design rules and technology file for the process being used. This minimum separation is abbreviated below as G0, and a separation smaller than this distance is called a sub-G0 distance. The minimum separation G0 between any given two polygons depends both on the technology node (e.g., 20 nm, 14 nm, etc.) and the geometry between the polygons (run-to-run, end-to-end, end-to-run, etc.). For each sequence of adjacent polygons separated by distances smaller than the applicable G0 distance, the mask assignments can initially be made round robin. Thus, for DPT, the initial assignments to six polygons separated by sub-G0 distances can be A-B-A-B-A-B. For TPT, the initial assignments to six polygons separated by sub-G0 distances can be A-B-C-A-B-C. For quadruple patterning, the initial assignments for six polygons separated by sub-G0 distances can be A-B-C-D-A-B.

At step 606, a loop including step 608 is performed for each set of N adjacent lines in the layout closer to each other than a minimum separation for patterning with a single photomask. For example, the adjacent lines can be parallel lines. For N photomasks, this step is readily performed in sets of N lines at a time.

In the example of FIG. 6, the stitching is performed for each of a plurality of lines. In some designs, there may be some "unimportant polygons," for which the parasitic uncertainty is not critical to timing of the IC. Therefore, distributive multiple patterning method is not necessarily applied to every polygon. It is not necessary to reduce the parasitic uncertainty of those "unimportant polygons" in this pre-coloring stage. Such patterns can just be assigned to a mask using a default double patterning method.

At step 608, the tool inserts at least N−1 stitches in each polygon (line) within that set of polygons to divide each polygon within that set into at least N parts, such that adjacent parts of different polygons are assigned to different photomasks from each other. For N segments, the stitches are assigned at an interval of L/N, where L is the length of the polygon (line), to initially divide the line into at least N even segments. Optionally, this step includes inserting at least one additional stitch into each polygon within at least one of the sets of N parallel polygons, each polygon within the at least one of the sets having the same number of additional stitches. If the polygons are to be divided into more than N segments, the segment size is reduced. As in the case of step 606, some designs may have additional "unimportant polygons," for which the parasitic uncertainty is not critical to timing of the IC. It is not necessary to reduce the parasitic uncertainty of those "unimportant polygons" in this pre-coloring stage. Such patterns can just be assigned to a mask using a default double patterning method.

Referring again to FIG. 3, the effect of this step for DPT (N=2) is shown. Each polygon is divided up into six segments, which is greater than N. Thus, each polygon includes four additional segments. The segments are each of length L/6. The parts of each stitched polygon are assigned to respective photomasks according to a sequence, and within each of the sets of polygons, each polygon has the same sequence, and each polygon has a different sequence offset from an adjacent one of the set of polygons. The sequence offset is the number of segments by which the sequence of the second pattern would be shifted in order to match the sequence of the first polygon. Thus, in FIG. 3, the sequence is A-B-A-B-A-B, and the bottom line has a sequence offset of one relative to the top line. The sequence of the bottom line is B-A-B-A-B-A. If the bottom line were shifted to the left by one segment, the corresponding adjacent segments of each polygon would align with each other. Other sequence offset values besides 1 can be used, but the sequence offset should not be evenly divisible by N. In some embodiments, by maintaining a constant sequence and a constant sequence offset, the tool ensures that any given pair of nearest adjacent segments in two different lines are formed by different masks.

Similarly, in FIG. 4, the effect of this step for TPT (N=3) is shown. In this example, each polygon is again divided up into six segments, which is greater than N. Thus, each polygon includes three additional segments. The sequence photomask assignments for the segments is A-B-C-A-B-C. As in the example of FIG. 3, the sequence offset is 1, which is not evenly divisible by N(3).

Similarly, in FIG. 5 the effect of this step for quadruple patterning (N=4) is shown. In this example, each polygon is again divided up into six segments, which is greater than N. Thus, each polygon includes two additional segments. The sequence photomask assignments for the segments is A-B-C-D-A-B. As in the example of FIG. 3, the sequence offset is 2, which is not evenly divisible by N(4).

FIGS. 8A-8F show examples of applications to more complex polygon shapes. In each of these figures, white lines and segments indicate polygons to be formed on a first photomask, and shaded lines and segments indicate polygons to be formed on a second photomask. In FIGS. 8A-8F, the layout further comprises a three-segment polygon (U-shaped polygon) 800 having first and second parallel line segments 801, 802 connected by a third (connecting) line segment 803.

Figure 8G:
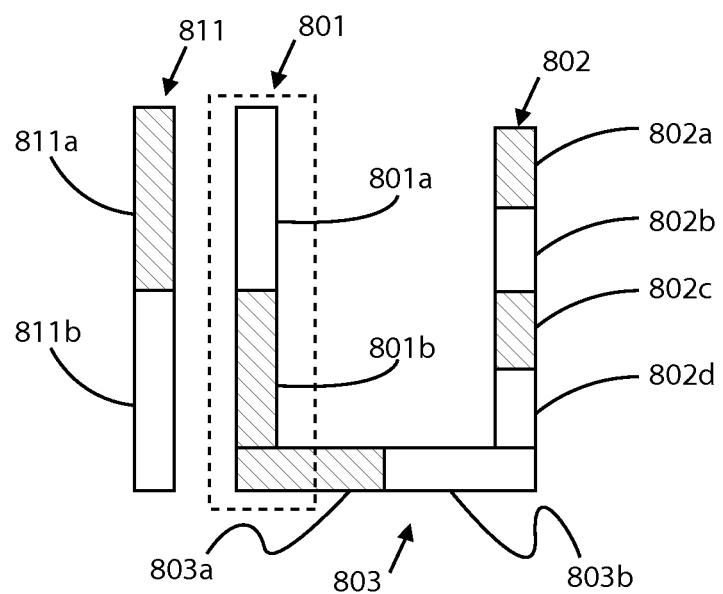

In the embodiments of FIGS. 8A-8E, the method further includes inserting at least one stitch into the third line segment 803. Thus, the third (connecting) line segment 803 is divided into at least two segments 803a, 803b, which can be (but are not required to be) formed on respectively different masks. The assignment of photomasks of the first segment should be based on the set of parallel polygons it belongs to, but not the second segment. For example, lines 801 and 811 form a set of parallel lines, so that their adjacent parts are assigned to different photomasks from each other in FIG. 8D. Then, line 802 is also assigned to different photomasks according to its respective set of parallel lines. There is no polygon closer to line 802 than the minimum separation for patterning with a single photomask in FIGS. 8D and 8F, so both configurations for 802 to be separated as FIG. 8D or FIG. 8G are acceptable.

In the embodiments of FIGS. 8B-8D the method further comprises inserting at least N−1 stitches in each of the first line segment 801 and second line segment 802 to divide each of the first and second line segments 801, 802 into at least N parts, such that corresponding parts of the first and second line segment are assigned to different photomasks from each other. In FIGS. 8B and 8D, polygons 801 and 802 are each divided into two segments, 801a, 801b and 802a, 802b, respectively. In FIGS. 8C and 8E, polygons 801 and 802 are each divided into four segments, 801a-801d and 802a-802d, respectively.

FIGS. 8D-8F show examples of segmenting an irregular polygon, such as the U-shaped polygon 800, if one line segment 801 of the polygon 800 has a single line 811 as neighbor: For the second line segment 802 without a neighboring polygon, it is sufficient to assign the polygon 802 equally to the N masks. When there is a neighboring line segment 811, additional rules are followed. The appropriate rule depends on whether the neighboring line segment 811 extends alongside the third (connecting) line segment 803. FIGS. 8E and 8F differ from FIG. 8D, in that the neighboring line segment 811 only extends alongside the vertical portion 801, and does not extend next to the horizontal portion 803.

In the case of a relatively complex polygon (e.g., 800) next to a relatively less complex polygon (e.g., 811), some embodiments first insert stitches into the more complex polygon 800, and subsequently insert one or more stitches into the less complex polygon 811, so as to complement the mask assignments of the more complex polygon.

For example, in FIG. 8D, the complex polygon 800 is segmented in the same manner shown in FIG. 8B. Then, the same number of stitches (one stitch) is inserted into the neighboring polygon 811, and each segment 811a, 811b of the neighboring polygon 811 is assigned to a mask different from the mask assignment of the nearest adjacent segment of the other polygon 800. In the case of DPT, since there are only two masks, the selection of a different mask results in selection, for each segment of one polygon, of the opposite mask from that used to pattern the adjacent segment of the other polygon. That is, since segments 801a and 801b are assigned to first and second masks respectively, the nearest adjacent segments 811a and 811b, respectively, are assigned to the second and first masks, respectively. In FIG. 8D, the neighboring polygon 811 extends the entire length of the polygon 800, extending as far as the bottom of line segment 803. Thus, in FIG. 8D, the bottom segment 811b should be assigned to the opposite mask from the mask used to form the segment 803a of connecting segment 803.

FIGS. 8E and 8F differ from FIG. 8D, in that the neighboring line 811 does not extend alongside line segment 803. This implies that if segments 801b and 803a are formed by the same mask, segment 811b should be formed by the opposite mask. If segments 801b and 803a were assigned to different masks from each other, then an additional stitch would be added to segment 811b, to form each portion of line segment 811 using a photomask opposite that of the nearest adjacent segment of polygon 800.

In FIG. 8E, the more complex polygon 800 is assigned first. The assignments are the same as shown in FIG. 8C. Then, the same number of stitches (three stitches) is inserted into the neighboring polygon 811, and each segment 811a-811d of the neighboring polygon 811 is assigned to a mask different from the mask assignment of the nearest adjacent segment of the other polygon 800. Again, for DPT this results in selection, for each segment of one polygon, of the opposite mask from that used to pattern the adjacent segment of the other polygon. That is, since segments 801a-801d are assigned to first, second, first and second masks, respectively, the nearest adjacent segments 811a and 811b, respectively, are assigned to the second, first, second and first masks, respectively.

FIG. 8E shows that there is somewhat greater flexibility when the neighboring pattern 811 does not extend alongside the connecting pattern 803. The line segments 802 and 803 are divided into different numbers of segments.

FIG. 8F shows another example for the layout shown in FIG. 8E, in which the neighboring pattern 811 does not extend alongside the connecting pattern 803. Stitches are inserted into the line segment 801 having a neighbor. The line segments 802 and 803 are not stitched. Each line segment 802 and 803 is assigned to a separate mask. According to another option in the method, additional optional stitches can be inserted to improve the balance between colors (mask assignments) in a given layer. Because the areas of line segments 802 and 803 are approximately the same, assigning each of these line segments to a different mask distributes the area evenly among both masks.

Figure 9A:
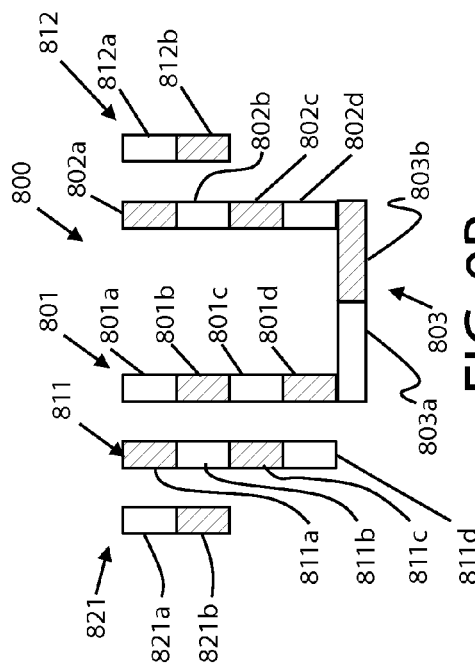
FIGS. 9A-9B show an example in which additional stitches are inserted to balance the masks.
Figure 9B:
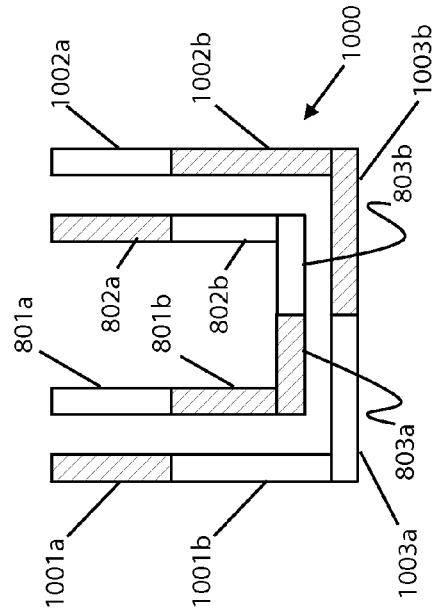

FIGS. 9A and 9B show how the tool handles layouts including a complex polygon 800 having several lines as neighbors. In some situations, the mask assignments will be subjected to additional rules, so that the additional neighboring lines are assigned to each of the N masks approximately equally. If the total area of the polygons and segments on each mask are equal or nearly equal, the uncertainty in the parasitic capacitance is reduced.

For example, FIG. 9A shows an intermediate set of assignments that may be made, prior to the final assignments in FIG. 9B.

According to one embodiment, where there are several neighboring lines, the method begins assigning masks to the most complex polygon 800, and works outward from polygon 800. The polygons 801 and 811 are assigned in a manner similar to that shown in FIG. 8E. The polygon 802 is initially assigned in the manner described above with reference to FIGS. 8B and 8D. The polygon 821 is near polygon 811. A stitch is inserted, and segments 821a and 821b are assigned to the oppose masks from those to which nearest adjacent segments 811a and 811b are assigned.

An examination of this preliminary set of assignments shows that every segment is adjacent to a segment having a different mask assignment, so there is no conflict. However, the assignments of polygons to masks are not even. There is a larger total area being patterned on the mask shown by white segments than on the mask shown by shaded segments.

Thus, referring again to FIG. 6, in step 614, according to some embodiments, a procedure is performed to more evenly distribute the segments.

At step 614, the tool determines that a total area of at least one set of N parallel polygons and parts of polygons assigned to each of the N photomasks. In this situation, step 616 is performed.

At step 616, the tool identifies at least one of the N photomasks to which the total assigned area is greater than another one of the N photomasks. For example, in FIG. 9A, the tool identifies that the total area of segments 821a, 811b, 811d, 801a, 801c, 803, 802b and 812 is greater than the total area of patterns 821b, 811a, 811c, 801b, 801d, 803b and 802a. Thus, step 616 inserts at least one additional stitch in at least one of the polygons (e.g., polygon 812) or parts of polygons assigned to the at least one of the N photomasks. This reduces the total area of the white segments and increases the total area of the shaded segments.

In some embodiments, steps 614 and 616 are repeated until the totals of areas of polygons and parts of polygons assigned to each of the N photomasks are within a predetermined limit, or no additional stitches can be inserted. Typically, design rules place a minimum length on line segments. Thus, in some situations, the minimum length limits the number of additional stitches that can be inserted for purpose of balancing mask assignments.

FIG. 9B shows a final set of mask assignments after insertion of additional stitches to balance the total area of the patterns formed by each photomask. In particular, additional stitches are inserted in segments 802a, 802b, and 812, resulting in segments 802a-802d and 812a-812b. The areas to be patterned by each photomask are now the same.

Figure 10A:
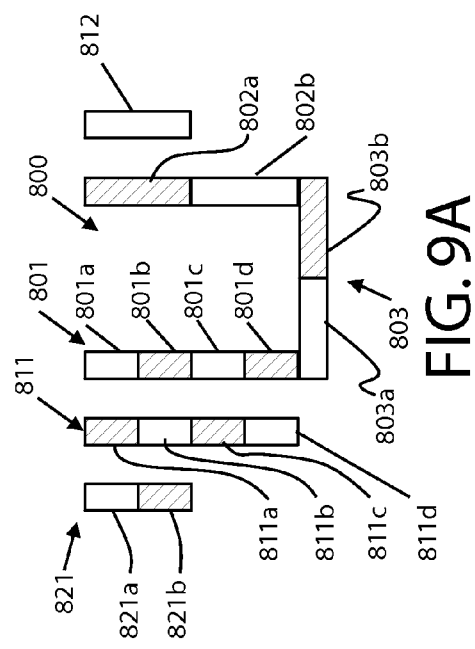
FIGS. 10A-10B show examples of the method of inserting stitches into adjacent complex polygons, each comprising plural line segments.
Figure 10B:
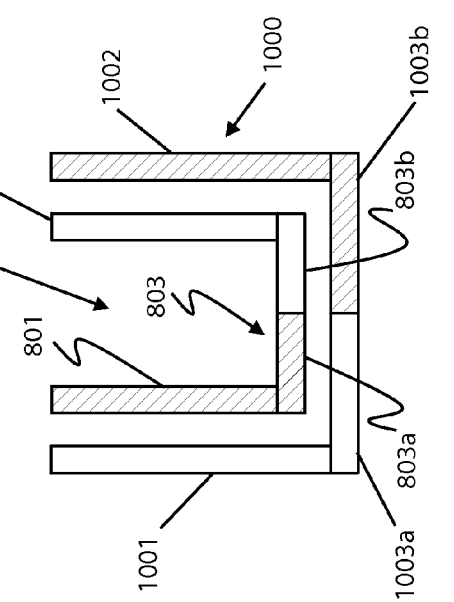

FIGS. 10A and 10B show another example, in which two complex polygons 800, 1000 are near each other. At least one stitch is inserted in each of the polygons 800, 1000. If the patterns each have about the same complexity (e.g., number of line segments), the assignment can begin with either of the polygons and proceed towards the other polygon. In FIG. 10A, polygon 800 can be segmented as shown in FIG. 8A and described above. Then, a stitch is inserted in pattern 1000 at the same horizontal coordinate as the stitch in pattern 800, so that the stitches are aligned, and the adjacent lines 1001, 1002 and segments 1003a, 1003b of polygon 1000 are aligned with and assigned to the opposite mask from, the respective lines 801, 802 and segments 803a, 803b of polygon 800.

FIG. 10B shows a similar result beginning with the mask assignments of FIG. 8B for the inner polygon 800. Then, stitches inserted in each line segment of polygon 1000, so that the stitches are aligned with those of polygon 800, and the adjacent lines segments 1001a, 1001b 1002a, 1002b 1003a, 1003b of polygon 1000 are aligned with and assigned to the opposite mask from, the respective lines 801a, 801b, 802a, 802b, 803a, and 803b of polygon 800.

At step 618, in some embodiments, if any large pattern remains, the method further comprises identifying at least one of the polygons or at least a part of one of the polygons which is separated from a nearest adjacent one of the polygons by a distance greater than the minimum separation (G0) for patterning with a single photomask, and inserting at least one stitch into the at least one polygon or part of the polygon.

FIGS. 11A and 11B show an example of this optional feature. In FIG. 11A, stitches have been inserted into every polygon having an adjacent neighbor separated by a sub-G0 distance. In particular, polygons 1101, 1102 and 1103 have stitches inserted, to divide them into segments 1101a, 1101b, 1102a-1102d, and 1103a-1103f, respectively. There is a sub-G0 distance between polygons 101 and 1102, so that segments 1101a, 1101b and 1102b, 1102a are assigned to opposite masks, respectively. Similarly, there is a sub-G0 distance between polygons 1102 and 1103, so segments 1102c, 1102d and 1103c, 1103d are assigned to opposite masks, respectively. However, there is no sub-G0 space between polygons 1101 and 1103. Thus, the large segment 1101a can be patterned clearly on a single mask. Nevertheless, when the spacing between neighboring patterns (e.g., 1101 and 1103) is larger than G0, additional stitches can still be inserted to reduce the parasitic uncertainty.

Thus, when step 618 identifies at least one of the plurality of polygons 1101 that is separated from every other one of the plurality of polygons by at least the minimum separation, step 616 is performed to insert at least one additional stitch into the at least one polygon 1101. In this example, two additional stitches are inserted, to accommodate the portion of polygon 1101 that is separated from its neighbor by a sub-G0 distance.

In some layouts, there are plural polygons that are separated from their nearest neighboring polygons by a distance that is at least the G0 separation, or larger. In some embodiments, when step 618 is performed, the tool identifies each of the plurality of polygons that that is separated from every other one of the plurality of polygons by at least the minimum separation, and inserting at least one stitch into each of the identified polygons.

Because neighboring patterns separated by more than the G0 distance can be assigned to the same mask, in some situations, inserting stitches only in patterns with sub-G0 separation does not balance the areas assigned to each mask. Thus, for some layouts, inserting additional stitches in patterns which are separated by the G0 distance of larger distance can further reduce the parasitic uncertainty by ensuring balanced assignments of circuit areas to each mask.

When all of the additional stitches have been inserted, the tool stores the data representing assignment of each of the parts in each set to respective photomasks in a non-transitory, computer readable storage medium that is accessible for use in a process to fabricate the N photomasks.

At step 620 of FIG. 6, the N photomasks are fabricated, for patterning the same layer of the IC by an MPT process.

Figure 7:
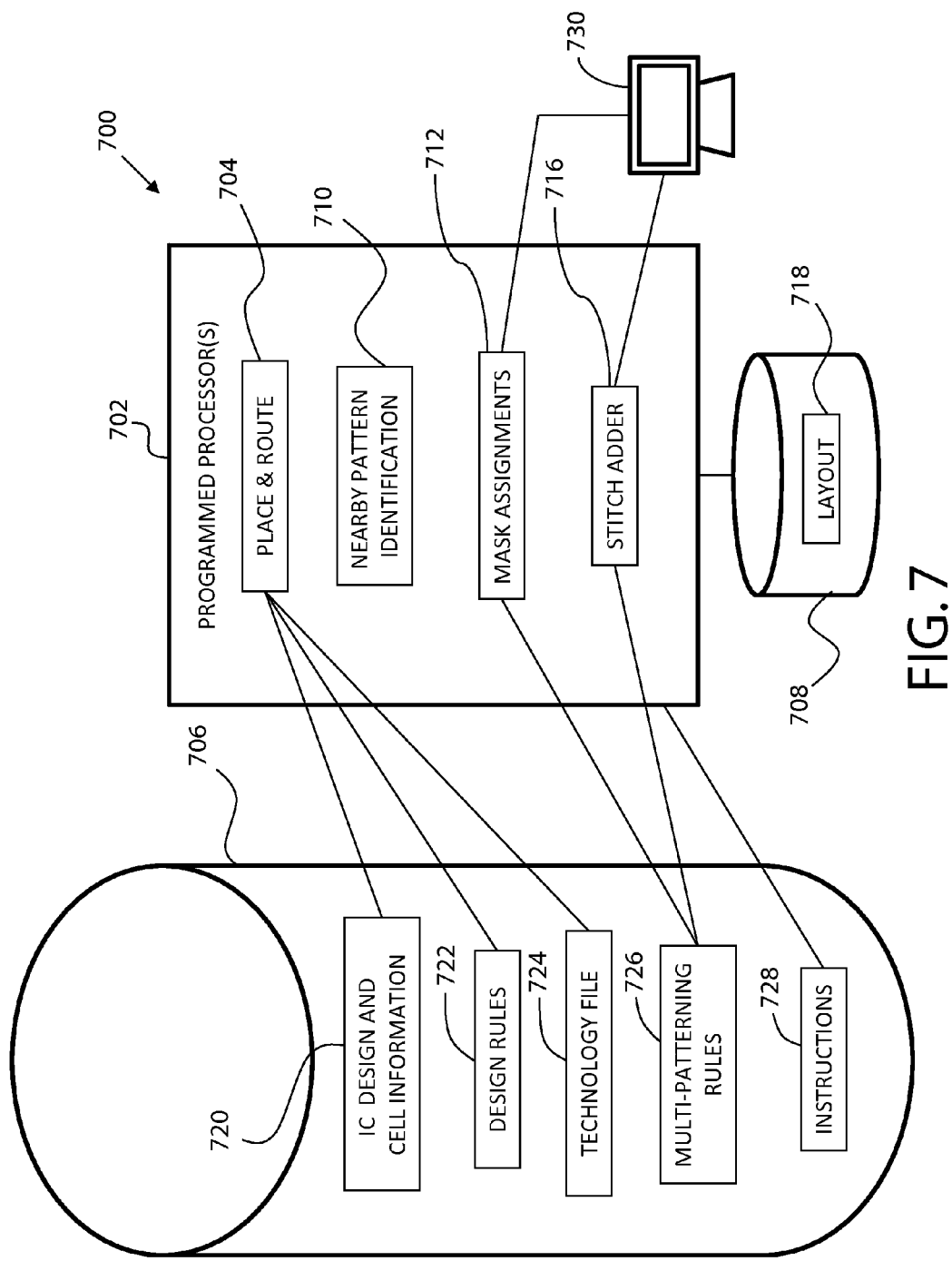
FIG. 7 is a block diagram of an embodiment of a system for inserting stitches into the layouts of FIGS. 2A to 5.

FIG. 7 is a block diagram of an embodiment of a system 700 for performing the method described above.

System 700 includes at least one non-transitory, computer readable storage medium 708 for storing data representing a layout 718 of a layer of an integrated circuit (IC) comprising a plurality of polygons defining circuit patterns to be divided among a number (N) of photomasks for multi-patterning a single layer of a semiconductor substrate, where N is greater than one. Either the same storage medium 708 or a different storage medium 706 stores data and instructions used by the EDA tool 702. These include, but are not limited to IC design and cell information 720, design rules 722, technology file 724, additional multi-patterning design rules 726, and software program instructions 728.

System 300 includes an electronic design automation ("EDA") tool 702 such as "IC COMPILER"™, sold by Synopsys, Inc. of Mountain View, Calif., which may include a place and route tool 304, such as "ZROUTE"™, also sold by Synopsys. Other EDA tools 702 may be used, such as the "VIRTUOSO" custom design platform or the Cadence "ENCOUNTER"® digital IC design platform may be used, along with the "VIRTUOSO" chip assembly router 704, all sold by Cadence Design Systems, Inc. of San Jose, Calif.

EDA tool 702 is a special purpose computer formed by retrieving stored program instructions from a non-transient computer readable storage medium 706, 708 and executing the instructions on a general purpose processor. Examples of non-transient computer readable storage mediums 706, 708 include, but are not limited to, hard disk drives (HDD), read only memories ("ROMs"), random access memories ("RAMs"), flash memories, or the like. Tangible, non-transient machine readable storage mediums 706, 708 are configured to store data generated by the place and route tool 704.

The router of the place and route tool 704 is capable of receiving an identification of a plurality of cells to be included in an integrated circuit ("IC") or interposer layout, including a netlist 720 containing pairs of cells within the plurality of cells to be connected to each other. Router 704 may be equipped with a set of default design rules 722 and tech file 724. Router 704 generates the custom interconnect routing lines and vias for interconnecting the various devices of the IC.

A nearby pattern identification module 710 determines, for a given polygon, which other polygons are nearer than the minimum separation distance G0. Optionally the nearby pattern identification module identifies additional polygons which are spaced further apart from the given pattern than the G0 distance, but are included in a sequence of polygons that are separated from each other or the given pattern by less than the G0 distance.

The mask assignment function 712 applies the MPT rules 726 and determines the initial assignment of each polygon to one of the photomasks. If any native conflicts are found (groups of polygons that cannot be divided among the available number of photomasks in any combination to avoid having two polygons closer to each other than the G0 distance), the native conflict is reported to the designer. For example, the native conflict can be displayed on the display device 730, and the user prompted to make a modification to the layout to resolve the native conflict (e.g., by re-routing a connection between two pins, or by inserting a stitch).

A stitch adder 716 inserts additional stitches in the manner described above. Because the stitch adder is 716 inserts stitches to reduce the uncertainty of parasitic capacitance calculations, the stitch adder 17 inserts additional stitches which are not required for purpose of resolving any native conflicts. The stitch adder can also insert stitches in patterns and/or portions of patterns that are separated from the nearest neighboring pattern by a distance greater than the minimum distance of patterning with a single mask. In other words, the stitch adder 716 can insert stitches in patterns that would not be stitched, if the criterion is to avoid having neighboring patterns on the same mask separated by a sub-G0 distance.

In some embodiments, the stitch adder 716 inserts at least N−1 stitch(es) in every set of N adjacent polygons separated from each other by less than the G0 separation (where N=number of masks). The stitch adder 716 inserts at least one additional stitch into each polygon within at least one of the sets of N adjacent polygons, each polygon within the at least one of the sets having the same number of additional stitches.

In some embodiments, for each complex polygon having plural line segments, the stitch adder 716 inserts at least N−1 stitches in each line segment of the complex polygon. For example, the stitch adder 716 is configured for inserting at least one stitch into a connecting segment of a three-segment polygon having first and second parallel segment connected by the connecting segment.

In some embodiments, the stitch adder 716 determines, for each of the N masks, the fraction of the patterns assigned to that mask, and inserts additional stitches into one or more of the polygons assigned to any of the masks which has substantially more than 1/N times the total area of at least one set of N parallel polygons for that layer of the IC. Thus, the stitch adder 716 is configured for: determining a total area of polygons and parts of polygons assigned to each of the N photomasks; identifying at least one of the N photomasks to which the total assigned area is greater than another one of the N photomasks; and inserting at least one additional stitch in at least one of the polygons or parts of polygons assigned to the at least one of the N photomasks.

The stitch adder 716 is configured to assign the parts of each stitched polygon to respective photomasks according to a sequence, so that within each of the sets of polygons, each polygon has the same sequence, and each polygon has a different sequence offset from an adjacent one of the set of polygons.

EDA tool 702 is configured for adding stitches to at least a subset of the polygons. For each set of N parallel polygons in the layout closer to each other than a minimum separation for patterning with a single photomask, EDA tool 702 is configured for inserting at least N−1 stitches in each polygon within that set of polygons to divide each polygon within that set into at least N parts, such that adjacent parts of different polygons are assigned to different photomasks from each other. EDA tool 702 is programmed for storing data representing assignment of each of the parts in each set to respective photomasks in the storage medium 708 for use in a process to fabricate the N photomasks.

Block 702 indicates that one or more programmed processors may be included. In some embodiments, the processing load is performed by two or more application programs, each operating on a separate processor. In other embodiments, the processes are all performed using one processor. Similarly, two media 306 and 308 are shown, but the data may be stored in any number of media.

Although FIG. 7 shows an allocation of the various tasks to specific modules, this is only one example. The various tasks may be assigned to different modules to improve performance, or improve the ease of programming.

By reducing the uncertainty in the parasitic capacitance computation, the methods and systems described herein allow the designer to avoid excessively pessimistic design margins.

In some embodiments, a method comprises: accessing data representing a layout of a layer of an integrated circuit (IC) comprising a plurality of polygons defining circuit patterns to be divided among a number (N) of photomasks for multi-patterning a single layer of a semiconductor substrate, where N is greater than one; for each set of N parallel polygons in the layout closer to each other than a minimum separation for patterning with a single photomask, inserting at least N−1 stitches in each polygon within that set of polygons to divide each polygon within that set into at least N parts, such that adjacent parts of different polygons are assigned to different photomasks from each other; and storing data representing assignment of each of the parts in each set to respective photomasks in a non-transitory, computer readable storage medium that is accessible for use in a process to fabricate the N photomasks.

In some embodiments, a system comprises a non-transitory, computer readable storage medium for storing data representing a layout of a layer of an integrated circuit (IC) comprising a plurality of polygons defining circuit patterns to be divided among a number (N) of photomasks for multi-patterning a single layer of a semiconductor substrate, where N is greater than one. An EDA tool is configured for adding stitches to at least a subset of the polygons, including for each set of N parallel polygons in the layout closer to each other than a minimum separation for patterning with a single photomask, inserting at least N−1 stitches in each polygon within that set of polygons to divide each polygon within that set into at least N parts, such that adjacent parts of different polygons are assigned to different photomasks from each other, and for storing data representing assignment of each of the parts in each set to respective photomasks in the storage medium for use in a process to fabricate the N photomasks.

In some embodiments, an integrated circuit (IC), comprises a semiconductor substrate having at least one interconnect line layer including a plurality of circuit patterns formed of conductive material. Each of the plurality of circuit patterns is divided into at least N segments, where N is greater than one, the conductive material in the at least N segments having N different depths. The depths of each of the segments are arranged, so that within each set of N circuit patterns that are parallel to each other and separated from each other by a distance smaller than a threshold distance, corresponding segments of different ones of the N circuit patterns which are adjacent to each other have different depths from each other.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
 accessing data representing a layout of a layer of an integrated circuit (IC) comprising a plurality of polygons defining circuit patterns to be divided among a number (N) of photomasks for multi-patterning a single layer of a semiconductor substrate, where N is greater than one;
 for at least one set of N parallel polygons in the layout closer to each other than a minimum separation for patterning with a single photomask, inserting at least N−1 stitches in each polygon within that set of polygons to divide each polygon within that set into at least N parts, such that adjacent parts of different polygons are assigned to different photomasks from each other, the parts of each stitched polygon are assigned to respective photomasks according to a sequence, and within each of the sets of polygons, each polygon has the same sequence, and each polygon has a different sequence offset from an adjacent one of the set of polygons; and
 storing data representing assignment of each of the parts in each set to respective photomasks in a non-transitory, computer readable storage medium that is accessible for use in a process to fabricate the N photomasks.

2. The method of claim 1, further comprising initially assigning each polygon to a respective one of the N photomasks before the step of inserting at least N−1 stitches.

3. The method of claim 1, wherein the step of inserting at least N−1 stitches includes inserting at least one additional stitch into each polygon within at least one set of N parallel polygons, each polygon within the at least one set having the same number of additional stitches.

4. The method of claim 1, wherein the layout further comprises a three-segment polygon having first and second parallel segments connected by a third segment, further comprising:
 inserting at least one stitch into the third segment.

5. The method of claim 4, further comprising inserting at least N−1 stitches in each of the first and second segment to divide each of the first and second segment into at least N parts.

6. The method of claim 1, further comprising:
 (a) determining a total area of polygons and parts of polygons assigned to each of the N photomasks;
 (b) identifying at least one of the N photomasks to which the total assigned area is greater than another one of the N photomasks; and
 (c) inserting at least one additional stitch in at least one of the polygons or parts of polygons assigned to the at least one of the N photomasks.

7. The method of claim 6, further comprising repeating steps (a), (b) and (c), until the totals of areas of polygons and parts of polygons assigned to each of the N photomasks are within a predetermined limit.

8. The method of claim 1, further comprising
 identifying at least one of the polygons or at least a part of one of the polygons which is separated from a nearest adjacent one of the polygons by a distance greater than the minimum separation for patterning with a single photomask, and
 inserting at least one stitch into the at least one polygon or part of the polygon.

9. The method of claim 1, further comprising
 identifying at least one of the plurality of polygons that is separated from every other one of the plurality of polygons by at least the minimum separation; and
 inserting at least one stitch into the at least one polygon.

10. The method of claim 1, further comprising
 identifying each of the plurality of polygons that is separated from every other one of the plurality of polygons by at least the minimum separation; and
 inserting at least one stitch into each of the identified polygons.

11. The method of claim 1, wherein the step of inserting N−1 stitches includes inserting at least one additional stitch into each polygon within at least one of the sets of N parallel polygons, each polygon within the at least one of the sets having the same number of additional stitches.

12. The method of claim 1, wherein the EDA tool is further configured for inserting at least one stitch into a connecting segment of a three-segment polygon having first and second parallel segment connected by the connecting segment.

13. The method of claim 1, wherein the inserting step is performed for each set of N parallel polygons in the layout closer to each other than a minimum separation for patterning with a single photomask.

14. A system comprising:
a non-transitory, computer readable storage medium for storing data representing a layout of a layer of an integrated circuit (IC) comprising a plurality of polygons defining circuit patterns to be divided among a number (N) of photomasks for multi-patterning a single layer of a semiconductor substrate, where N is greater than one;
an EDA tool configured for adding stitches to at least a subset of the polygons, including for each set of N parallel polygons in the layout closer to each other than a minimum separation for patterning with a single photomask, inserting at least N−1 stitches in each polygon within that set of polygons to divide each polygon within that set into at least N parts, such that adjacent parts of different polygons are assigned to different photomasks from each other, and for storing data representing assignment of each of the parts in each set to respective photomasks in the storage medium for use in a process to fabricate the N photomasks, wherein the EDA tool is configured to assign the parts of each stitched polygon to respective photomasks according to a sequence, so that within each of the sets of polygons, each polygon has the same sequence, and each polygon has a different sequence offset from an adjacent one of the set of polygons.

15. The system of claim 14, wherein the EDA tool is configured for:
(a) determining a total area of polygons and parts of polygons assigned to each of the N photomasks;
(b) identifying at least one of the N photomasks to which the total assigned area is greater than another one of the N photomasks; and
(c) inserting at least one additional stitch in at least one of the polygons or parts of polygons assigned to the at least one of the N photomasks.

16. The system of claim 14, wherein the EDA tool is configured for:
identifying at least one polygon or part of a polygon which is separated from a nearest adjacent polygon by a distance greater than the minimum separation for patterning with a single photomask, and
inserting at least one stitch into the at least one polygon or part of the polygon.

17. A method comprising:
accessing data representing a layout of a layer of an integrated circuit (IC) comprising a plurality of polygons defining circuit patterns to be divided among a number (N) of photomasks for multi-patterning a single layer of a semiconductor substrate, where N is greater than one;
for at least one set of N parallel polygons in the layout closer to each other than a minimum separation for patterning with a single photomask, inserting at least N−1 stitches in each polygon within that set of polygons to divide each polygon within that set into at least N parts, such that adjacent parts of different polygons are assigned to different photomasks from each other;
determining a total area of polygons and parts of polygons assigned to each of the N photomasks;
identifying at least one of the N photomasks to which the total assigned area is greater than another one of the N photomasks;
inserting at least one additional stitch in at least one of the polygons or parts of polygons assigned to the at least one of the N photomasks; and
storing data representing assignment of each of the parts in each set to respective photomasks in a non-transitory, computer readable storage medium that is accessible for use in a process to fabricate the N photomasks.

18. The method of claim 17, further comprising repeating the determining step, the identifying step, and the inserting step, until the totals of areas of polygons and parts of polygons assigned to each of the N photomasks are within a predetermined limit.

19. The method of claim 17, further comprising initially assigning each polygon to a respective one of the N photomasks before the step of inserting at least N−1 stitches.

20. The method of claim 17, wherein the step of inserting at least N−1 stitches includes inserting at least one additional stitch into each polygon within at least one set of N parallel polygons, each polygon within the at least one set having the same number of additional stitches.

21. The method of claim 17, wherein the layout further comprises a three-segment polygon having first and second parallel segments connected by a third segment, further comprising:
inserting at least one stitch into the third segment.

22. The method of claim 17, further comprising
identifying at least one of the polygons or at least a part of one of the polygons which is separated from a nearest adjacent one of the polygons by a distance greater than the minimum separation for patterning with a single photomask, and
inserting at least one stitch into the at least one polygon or part of the polygon.

* * * * *